United States Patent
Yang (10) Patent No.: US 11,985,468 B2
(45) Date of Patent: May 14, 2024

(54) WIRELESS EARPHONE SERIAL PORT CONTROL METHOD AND APPARATUS, WIRELESS EARPHONE, AND STORAGE MEDIUM

(71) Applicant: GOERTEK INC., Shandong (CN)

(72) Inventor: Pei Yang, Shandong (CN)

(73) Assignee: GOERTEK INC., Shandong (CN)

( * ) Notice: Subject to any disclaimer, the term of this patent is extended or adjusted under 35 U.S.C. 154(b) by 305 days.

(21) Appl. No.: 17/613,576

(22) PCT Filed: Sep. 28, 2019

(86) PCT No.: PCT/CN2019/108790
§ 371 (c)(1),
(2) Date: Nov. 23, 2021

(87) PCT Pub. No.: WO2021/017147
PCT Pub. Date: Feb. 4, 2021

(65) Prior Publication Data
US 2022/0248123 A1    Aug. 4, 2022

(30) Foreign Application Priority Data
Jul. 26, 2019   (CN) .......................... 201910684290.9

(51) Int. Cl.
*H04R 1/10*    (2006.01)
*G06F 13/42*   (2006.01)

(52) U.S. Cl.
CPC ....... *H04R 1/1041* (2013.01); *G06F 13/4282* (2013.01); *H04R 1/1025* (2013.01); *G06F 2213/0002* (2013.01); *H04R 2420/07* (2013.01)

(58) Field of Classification Search
CPC ................. H04R 1/1041; H04R 1/1025; H04R 2420/07; G06F 13/4282; G06F 2213/0002
(Continued)

(56) References Cited

U.S. PATENT DOCUMENTS

| 2016/0064979 A1* | 3/2016 | Huang | ................. | H02J 7/0071 320/114 |
| 2016/0285757 A1* | 9/2016 | Srivastava | ............ | H04L 45/566 |

(Continued)

FOREIGN PATENT DOCUMENTS

| CN | 108769856 | 11/2018 |
| CN | 109547884 | 3/2019 |

(Continued)

OTHER PUBLICATIONS

International Search Report issued in PCT/CN2019/108790 dated Apr. 26, 2020.

*Primary Examiner* — William J Deane, Jr.
(74) *Attorney, Agent, or Firm* — HAUPTMAN HAM, LLP (57) ABSTRACT

Disclosed are a method and a device for controlling a serial interface of a wireless earphone, a wireless earphone, and a computer readable storage medium. The method includes: disabling a serial interface function of the wireless earphone in a case that a first predetermined condition is met, where the first predetermined condition includes that the wireless earphone is outside a charging case, or the wireless earphone is in the charging case and a lid of the charging case is closed; and enabling the serial interface function of the wireless earphone in a case that a second predetermined condition is met, where the second predetermined condition includes that the wireless earphone is in the charging case and the lid of the charging case is open.

6 Claims, 7 Drawing Sheets

(58) Field of Classification Search
USPC .................................................. 381/74, 79
See application file for complete search history.

(56) References Cited

U.S. PATENT DOCUMENTS

| | | | |
|---|---|---|---|
| 2018/0123355 A1* | 5/2018 | Olson | H02J 7/00718 |
| 2018/0327550 A1* | 11/2018 | Andrianov, Jr. | A61K 39/39 |
| 2018/0367883 A1* | 12/2018 | Minoo | H04R 1/1041 |
| 2019/0208342 A1* | 7/2019 | Higgins | H04R 25/602 |
| 2020/0107174 A1 | 4/2020 | Tong et al. | |
| 2021/0160955 A1 | 5/2021 | Zhong | |

FOREIGN PATENT DOCUMENTS

| | | |
|---|---|---|
| CN | 109739792 | 5/2019 |
| CN | 209046842 | 6/2019 |
| CN | 209072692 | 7/2019 |
| CN | 209134611 | 7/2019 |
| WO | WO2018093412 | 5/2018 |

* cited by examiner

WIRELESS EARPHONE SERIAL PORT CONTROL METHOD AND APPARATUS, WIRELESS EARPHONE, AND STORAGE MEDIUM

The present application is a 371 application of International Patent Application No. PCT/CN2019/108790, titled "WIRELESS EARPHONE SERIAL PORT CONTROL METHOD AND APPARATUS, WIRELESS EARPHONE, AND STORAGE MEDIUM", filed on Sep. 28, 2019, which claims priority to Chinese Patent Application No. 201910684290.9, titled "WIRELESS EARPHONE SERIAL PORT CONTROL METHOD AND APPARATUS, WIRELESS EARPHONE, AND STORAGE MEDIUM", filed on Jul. 26, 2019 with the Chinese Patent Office, both of which are incorporated herein by reference in their entireties.

FIELD

The present disclosure relates to the field of earphone technologies, and in particular to a method and a device for controlling a serial interface of a wireless earphone, a wireless earphone, and a computer readable storage medium.

BACKGROUND

With the development of Bluetooth technologies, the trend of intelligence and wireless are deeply reflected in Bluetooth earphone products. For earphones such as TWS (True Wireless) earphones, the TWS technology means that a mobile phone is connected with a master earphone, and the master earphone is connected with a slave earphone through Bluetooth in a wireless manner, to realize true wireless while providing separation of a left sound channel and a right sound channel via Bluetooth.

In basic functions of the conventional TWS earphones, communication is generally performed through a serial interface, for exchanging information and states between the earphone and an earphone case. However, the communication through the serial interface results in high power consumption of the wireless earphone, which causes short standby time of the wireless earphone.

Therefore, how to reduce the power consumption of the wireless earphone is a technical problem that is required to be solved by those skilled in the art.

SUMMARY

A method and a device for controlling a serial interface of a wireless earphone, a wireless earphone, and a computer readable storage medium are provided according to the present disclosure to reduce power consumption of the wireless earphone.

In order to realize the above objectives, a method for controlling a serial interface of a wireless earphone is provided. The method includes:
 disabling a serial interface function of the wireless earphone in a case that a first predetermined condition is met, where the first predetermined condition includes that the wireless earphone is outside a charging case, or the wireless earphone is in the charging case and a lid of the charging case is closed; and
 enabling the serial interface function of the wireless earphone in a case that a second predetermined condition is met, where the second predetermined condition includes that the wireless earphone is in the charging case and the lid of the charging case is open.

After the disabling a serial interface function of the wireless earphone, the method further includes:
 setting a RX/TX interface of the wireless earphone to be a general IO interface.

After the stetting a RX/TX interface of the wireless earphone to be a general IO interface, the method further includes:
 activating interrupt enablement of the RX/TX interface, and
 before the enabling the serial interface function of the wireless earphone, the method further includes:
 receiving an idle code transmitted by the earphone case and triggering an interrupt of the RX/TX interface.

The method further includes:
 detecting whether a voltage at VBUS is equal to a predetermined voltage;
 determining that the wireless earphone is in the charging case and that the second predetermined condition is met in a case that the voltage at VBUS is equal to the predetermined voltage; and
 determining that the wireless earphone is outside the charging case and that the first predetermined condition is met in a case that the voltage at VBUS is not equal to the predetermined voltage.

After it is determined that the second predetermined condition is met, the method further includes:
 determining that the first predetermined condition is met on reception of an instruction indicating that the lid of the charging case is closed.

The determining that the first predetermined condition is met includes:
 starting a countdown of a predetermined time period; and
 determining that the first predetermined condition is met when the countdown ends.

In order to realize the above objectives, a device for controlling a serial interface of a wireless earphone is further provided according to the present disclosure. The device includes a first controlling module and a second controlling module.

The first controlling module is configured to disable a serial interface function of the wireless earphone in a case that a first predetermined condition is met. The first predetermined condition includes that the wireless earphone is outside a charging case, or the wireless earphone is in the charging case and a lid of the charging case is closed.

The second controlling module configured to enable the serial interface function of the wireless earphone in a case that a second predetermined condition is met. The second predetermined condition includes that the wireless earphone is in the charging case and the lid of the charging case is open.

The device further includes a setup module.

The setup module is configured to set an RX/TX interface of the wireless earphone to be ordinary general IO interface in a case that the second predetermined condition is met.

In order to realize the above objectives, a wireless earphone is provided according to the present disclosure. The wireless earphone includes a memory and a processor.

The memory is configured to store a computer program.

The processor is configured to execute the computer program to perform the above method for controlling a serial interface of a wireless earphone.

In order to realize the above objectives, a computer readable storage medium is provided according to the present disclosure. The computer readable storage medium stores a computer program that, when being executed by a processor, performs the above method for controlling a serial interface of a wireless earphone.

As can be seen from the above solutions, the method for controlling a serial interface of a wireless earphone according to the present disclosure includes: disabling a serial interface function of the wireless earphone in a case that a first predetermined condition is met, where the first predetermined condition includes that the wireless earphone is outside a charging case, or the wireless earphone is in the charging case and a lid of the charging case is closed; and enabling the serial interface function of the wireless earphone in a case that a second predetermined condition is met, where the second predetermined condition includes that the wireless earphone is in the charging case and the lid of the charging case is open.

It can be seen that in the method for controlling a serial interface of a wireless earphone according to the present disclosure, the serial interface communication function of the wireless earphone is controlled by detecting whether the lid of the charging case is open or closed and detecting whether the wireless earphone is in the charging case. That is, in a case that the wireless earphone is outside the charging case or in a case that the wireless earphone is in the charging case and the lid of the charging case is closed, the serial interface function is disabled, thereby reducing the power consumption caused by the serial interface function, and increasing the standby time of the wireless earphone. A device for controlling a serial interface of a wireless earphone, a wireless earphone, and a computer readable storage medium are further provided according to the present disclosure. The device, the wireless earphone and the computer readable storage medium also have the above technical effects.

It should be understood that the above general description and the following detailed description are only exemplary and do not limit the present disclosure.

BRIEF DESCRIPTION OF THE DRAWINGS

In order to more clearly describe the technical solutions in the embodiments of the present disclosure or the technical solutions in the conventional technology, drawings to be used in the description of the embodiments of the present disclosure or the conventional technology are briefly described hereinafter. It is apparent that the drawings described below are merely used for describing some embodiments of the present disclosure, and those skilled in the art may obtain other drawings according to the provided drawings without any creative effort. The drawings are used for helping further understanding of the present disclosure and form part of the specification. The drawings are used for describing the present disclosure in conjunction with the following embodiments rather than limiting the present disclosure. In the drawings.

DETAILED DESCRIPTION OF EMBODIMENTS

Technical solutions of embodiments of the present disclosure are described below clearly and completely in conjunction with the drawings of the embodiments of the present disclosure. Apparently, the embodiments described below are only some embodiments of the present disclosure, rather than all the embodiments. Any other embodiments obtained by those skilled in the art based on the embodiments in the present disclosure without any creative effort fall within the protection scope of the present disclosure.

A wireless earphone generally has small battery capacity of 30 mA to 40 mA, which imposes a high requirement on power consumption of the wireless earphones. In basic functions of the conventional TWS earphones, communication is generally performed through a serial interface for exchanging information and states between the wireless earphone and a charging case. When the serial interface of the wireless earphone operates normally, the wireless cannot operate at low power consumption (dozens of uA), but operates at power consumption ranging from hundreds of uA to 1 mA, which accounts for a significant proportion of the overall standby power consumption of the wireless earphone. Therefore, in the present disclosure, in a case that a predetermined condition is met, that is, in a case that the wireless earphone is not to communicate with the charging case, a serial interface function is disabled to reduce the power consumption caused by the serial interface function, thereby increasing the standby time of the wireless earphone.

Figure 1:
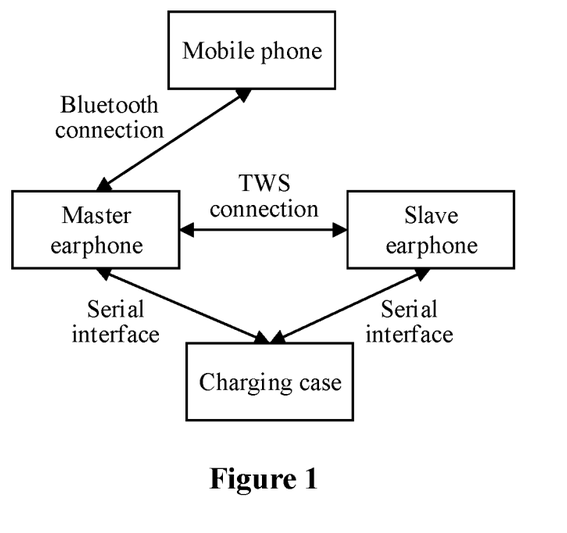
FIG. 1 is a schematic diagram of architecture of a serial interface control system of a wireless earphone.
Figure 2:
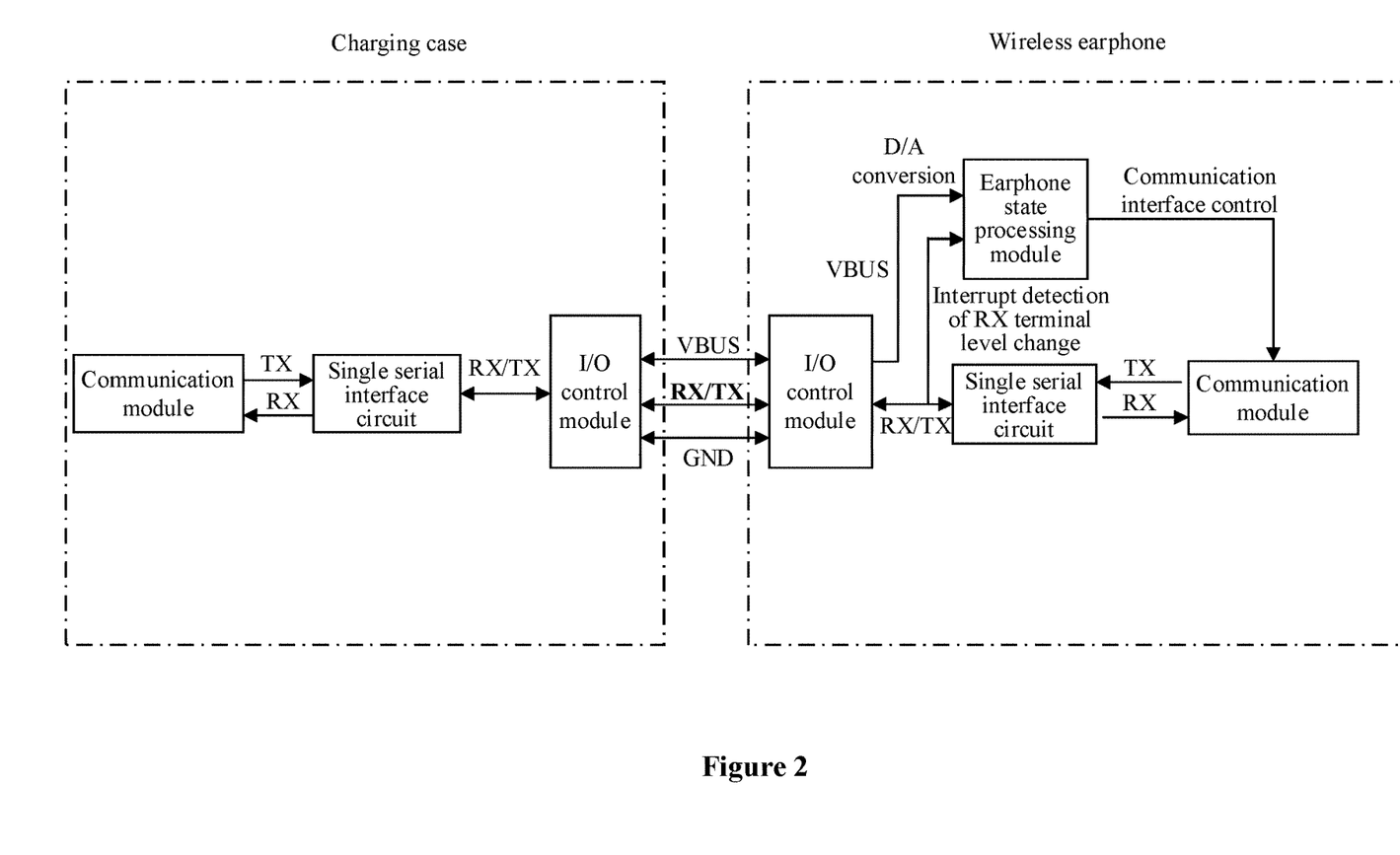
FIG. 2 is a schematic diagram of architecture showing communication between a wireless earphone and a charging case.
Figure 3:
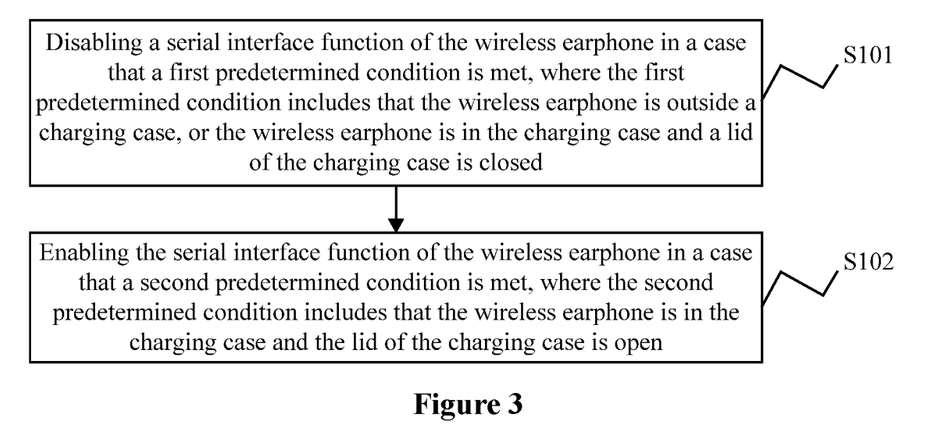
FIG. 3 is a flowchart of a method for controlling a serial interface of a wireless earphone according to an exemplary embodiment.
Figure 4:
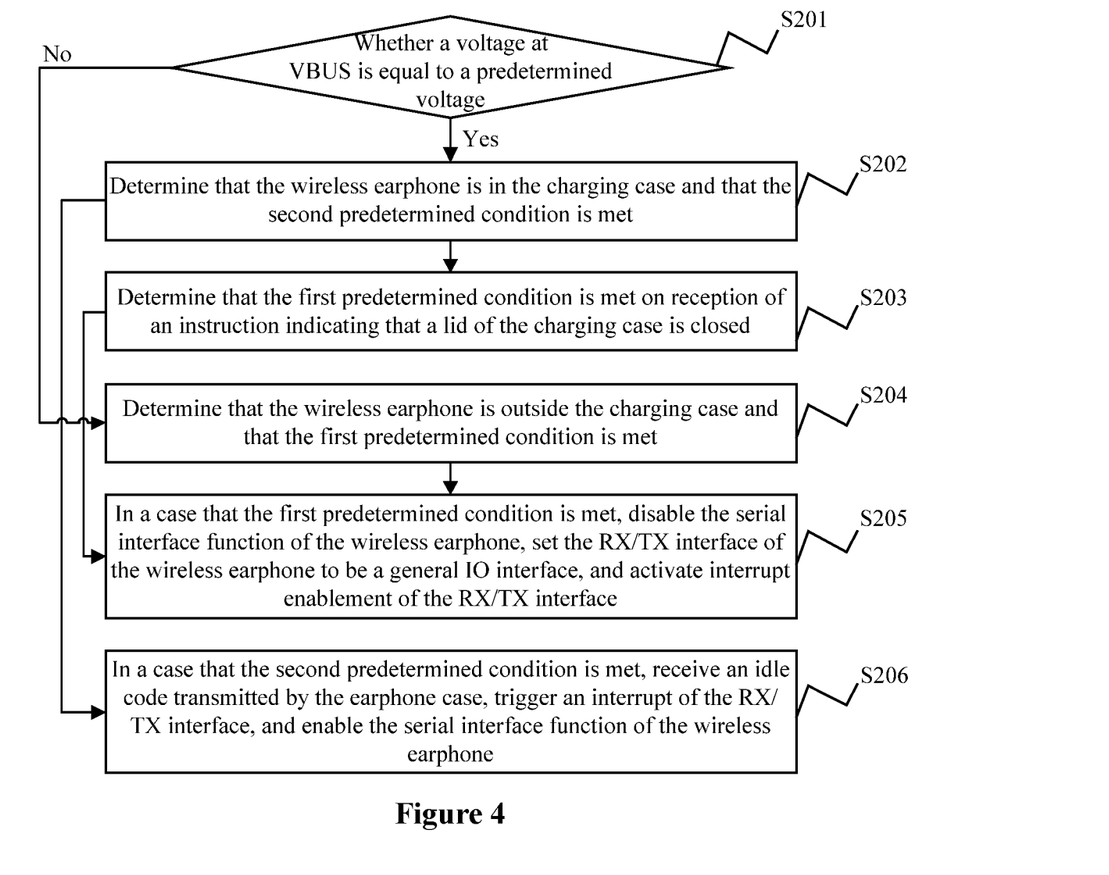
FIG. 4 is a flowchart of a method for controlling a serial interface of a wireless earphone according to another exemplary embodiment.

For facilitating understanding of the method for controlling a serial interface of a wireless earphone according to present disclosure, a system to which the method is applied is introduced first. As shown in FIG. 1, a mobile phone is connected with a master earphone through Bluetooth. The master earphone is connected with a slave earphone through TWS. Each of the master earphone and the slave earphone is connected with a charging case through a serial interface. The serial interface includes VBUS, RX (transport)/TX (receive), and GND. That is, the earphone interacts with the charging case through three electrical contacts. Internal structures of the wireless earphone and the charging case are shown in FIG. 2. The charging case includes a communication module, a single-serial interface circuit and an IO control module. The wireless earphone includes an IO control module, a single-serial interface circuit, a communication module and an earphone state processing module.

A method for controlling a serial interface of a wireless earphone is provided according to an embodiment of the present disclosure to reduce power consumption of the wireless earphone.

Referring to FIG. 1, which is a flowchart of a method for controlling a serial interface of a wireless earphone according to an exemplary embodiment. As shown in FIG. 1, the method includes the following steps S101 and S102.

In step S101, a serial interface function of the wireless earphone is disabled in a case that a first predetermined condition is met. The first predetermined condition includes that the wireless earphone is outside a charging case, or the wireless earphone is in the charging case and a lid of the charging case is closed.

In this step, in a case that the first predetermined condition is met, the wireless earphone is not required to exchange information with the charging case. In this case, the serial interface function is disabled, and an RX/TX interface of the wireless earphone is set to be a general IO interface to reduce power consumption. The first predetermined condition herein includes that the wireless earphone is outside the charging case, or the wireless earphone is in the charging case and the lid of the charging case is closed.

It should be noted that in order to enable the serial interface function of the RX/TX interface in subsequent steps, after the RX/TX interface of the wireless earphone is set to be a general IO interface, the method further includes: activating interrupt enablement of the RX/TX interface. The interrupt is used for enabling the serial interface function of the RX/TX interface in subsequent steps.

In step S102, the serial interface function of the wireless earphone is enabled in a case that a second predetermined condition is met. The second predetermined condition includes that the wireless earphone is in the charging case and the lid of the charging case is open.

In this step, in a case that the second predetermined condition is met, the wireless earphone is required to exchange information with the charging case, that is, the wireless earphone is in the charging case and lid of the charging case is open. In this case, the serial interface function is enabled. The following functions can be realized through serial communication:
  (1) displaying, by the charging case, a power state of the wireless earphone, including: full power, normal power, and low power;
  (2) forcibly pairing wireless earphones;
  (3) acquiring an action of opening or closing the lid of the charging case; and
  (4) OTA (Over-the-Air Technology) upgrade.

In a case that the wireless earphone is in the charging case, and when the lid of the charging case is opened, the charging case transmits an idle code to the wireless earphone. On reception of the idle code, the wireless earphone triggers interruption of the RX/TX interface to enable the serial interface function of the RX/TX interface, realizing information exchange between the wireless earphone and the charging case. That is, before the serial interface function of the wireless earphone is enabled, the method further includes: receiving the idle code transmitted by the earphone case and triggering interrupt of the RX/TX interface.

It can be seen that in the method for controlling a serial interface of a wireless earphone according to the embodiment of the present disclosure, the serial interface communication function of the wireless earphone is controlled by detecting whether the lid of the charging case is open or closed and detecting whether the wireless earphone is in position. That is, in a case that the wireless earphone is outside the charging case or in a case that the wireless earphone is in the charging case and the lid of the charging case is closed, the serial interface function is disabled, thereby reducing the power consumption caused by the serial interface function, and increasing the standby time of the wireless earphone.

A method for controlling a serial interface of a wireless earphone is provided according to another embodiment of the present disclosure. The technical solution of this embodiment which is optimized as compared with the above embodiment is described below.

FIG. 2 is a flowchart of a method for controlling a serial interface of a wireless earphone according to another exemplary embodiment. As shown in FIG. 2, the method includes the following steps S201 to S206.

In step S201, it is detected whether a voltage at VBUS voltage is equal to a predetermined voltage. Step S202 is performed in a case that the voltage at VBUS is equal to the predetermined voltage, and step S204 is performed in a case that the voltage at VBUS is not equal to the predetermined voltage.

A process of detecting the first predetermined condition and the second predetermined condition is described in this embodiment. In this step, the IO control module in the wireless earphone acquires the VBUS voltage, and the VBUS voltage is transmitted to the earphone state processing module after D/A conversion (digital-to-analog conversion, for converting a digital signal into an analog signal). The earphone state processing module detects whether the VBUS voltage is equal to the predetermined voltage, which is generally 5V for wireless earphones. The VBUS voltage being equal to the predetermined voltage indicates that the wireless earphone is in the charging case, and step S202 is performed, and the VBUS voltage being not equal to the predetermined voltage indicates that the wireless earphone is outside the charging case, and step S204 is performed.

In step S202, it is determined that the wireless earphone is in the charging case and that the second predetermined condition is met.

In this step, in a case that the wireless earphone is in the charging case, it is determined that the second predetermined condition is met and step S206 is performed. In addition, step S203 is performed to make further determination.

In this step S203, it is determined that the first predetermined condition is met on reception of an instruction indicating that a lid of the charging case is closed.

In this step, the wireless earphone is in the charging case. When the lid of the charging case is closed, the charging case transmits to the wireless earphone the instruction indicating that the lid of the charging case is closed, and it is determined that the first predetermined condition is met. Preferably, in order to avoid a mistaken determination resulted from the user mistakenly closing the lid, a countdown of a predetermined time period, such as 10s, from the reception of the instruction indicating that the lid of the charging case is closed by the wireless earphone may be set. It is determined that the first predetermined condition is met when the countdown ends. That is, the step includes: starting the countdown of the predetermined time period on reception of the instruction indicating that the lid of the charging case is closed, and determining that the first predetermined condition is met and performing step S205 when the countdown ends.

In step S204, it is determined that the wireless earphone is outside the charging case and that the first predetermined condition is met.

In this step, the wireless earphone is outside the charging case. It is determined that the first predetermined condition is met and step S205 is performed.

In step S205, in a case that the first predetermined condition is met, the serial interface function of the wireless earphone is disabled, the RX/TX interface of the wireless earphone is set to be a general IO interface, and the interrupt enablement of the RX/TX interface is activated.

In step S206, in a case that the second predetermined condition is met, an idle code transmitted by the earphone case is received, an interrupt of the RX/TX interface is triggered, and the serial interface function of the wireless earphone is enabled.

Figure 5:
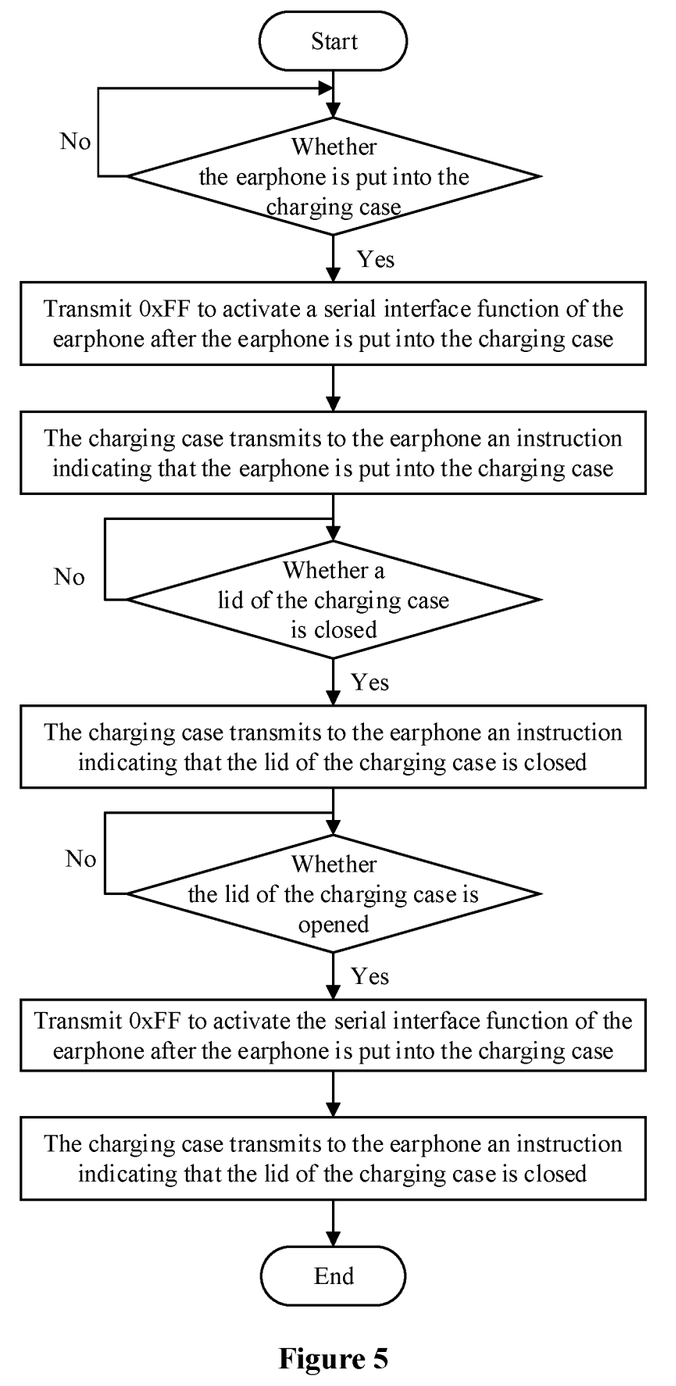
FIG. 5 is a flowchart of a controlling process performed by a charging case.

An application embodiment of a process performed by the charging case is described below. As shown in FIG. 5, the process includes the following steps 1 to 3.

In step 1, based on detection that the earphone is put into the charging case, the charging case transmits a 0xFF idle code to activate a serial communication function of the earphone, and then transmits to the earphone an instruction indicating that the earphone is put into the charging case.

In step 2, after the lid of the charging case is closed, the charging case transmits to the earphone an instruction indicating that the lid of the charging case is closed.

In step 3, after the lid of the charging case is opened, the charging case transmits the 0xFF idle code to activate the serial communication function of the earphone, and then transmits to the earphone an instruction indicating that the lid of the charging case is opened.

Figure 6:
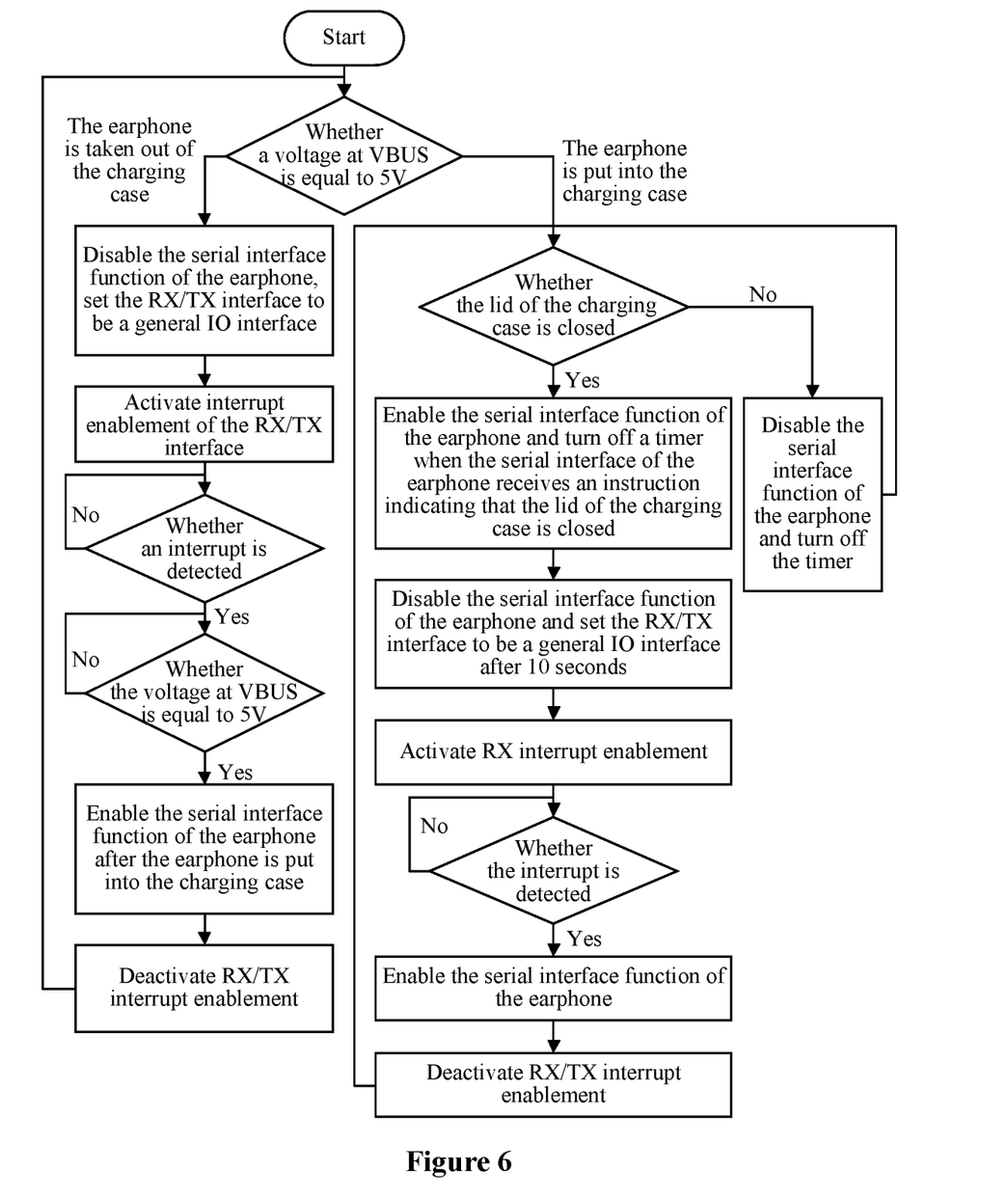
FIG. 6 is a flowchart of a controlling process performed by a wireless earphone.

An application embodiment of a process performed by the wireless earphone is described below. As shown in FIG. 6, the process includes the following steps 1 to 5.

In step 1, an action of taking the wireless earphone out of the charging case is detected by detecting the VBUS voltage.

In step 2, after the wireless earphone is taken out of the charging case, the serial interface function is disabled, the RX/TX interface is set to be a general IO interface, and the interrupt enablement of the RX interface is enabled.

In step 3, after the wireless earphone is put into the charging case, the charging case transmits an idle code to the earphone, an interrupt is triggered, and the serial interface function is enabled.

In step 4, when the wireless earphone in the charging case receives an instruction indicating that the lid of the charging case is closed, a timer is started. After 10 seconds, the serial interface function is disabled, the RX/TX interface is set to be a general IO interface, and the interrupt enablement of the RX interface is activated.

In step 5, after the lid of the charging case is opened, the charging case transmits an idle code to the earphone, an interrupt is triggered, and the serial interface function of the earphone is enabled.

A device for controlling a serial interface of a wireless earphone according to an embodiment of the present disclosure is described below. The device for controlling a serial interface of a wireless earphone described below and the method for controlling a serial interface of a wireless earphone described above may be cross referenced.

Figure 7:
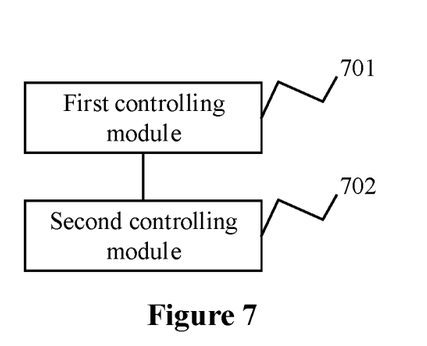
FIG. 7 is a schematic structural diagram of a device for controlling a serial interface of a wireless earphone according to an exemplary embodiment.

FIG. 7 is a schematic structural diagram of a device for controlling a serial interface of a wireless earphone according to an exemplary embodiment. As shown in FIG. 7, the device includes a first controlling module 701 and a second controlling module 702.

The first controlling module 701 is configured to disable a serial interface function of the wireless earphone in a case that a first predetermined condition is met. The first predetermined condition includes that the wireless earphone is outside a charging case, or the wireless earphone is in the charging case and a lid of the charging case is closed.

The second controlling module 702 is configured to enable the serial interface function of the wireless earphone in a case that a second predetermined condition is met. The second predetermined condition includes that the wireless earphone is in the charging case and the lid of the charging case is open.

It can be seen that in the system for controlling a serial interface of a wireless earphone according to the embodiment of the present disclosure, the serial interface communication function of the wireless earphone is controlled by detecting whether the lid of the charging case is open or closed and detecting whether the wireless earphone is in position. That is, in a case that the wireless earphone is outside the charging case or in a case that the wireless earphone is in the charging case and the lid of the charging case is closed, the serial interface function is disabled, thereby reducing the power consumption caused by the serial interface function, and increasing the standby time of the wireless earphone.

Based on the above embodiments, as a preferred embodiment, the device further includes a setup module.

The setup module is configured to set an RX/TX interface of the wireless earphone to be a a general 10 interface in a case that the second predetermined condition is met.

Based on the above embodiments, as a preferred embodiment, the device further includes a third control module and a trigger module.

The third control module is configured to activate interrupt enablement of the RX/TX interface after the RX/TX interface of the wireless earphone is set to be a general 10 interface.

The trigger module is configured to, before the serial interface function of the wireless earphone is enabled, receive an idle code transmitted by the earphone case and trigger an interrupt of the RX/TX interface.

Based on the above embodiments, as a preferred embodiment, the device further includes a detection module, a first determination module, and a second determination module.

The detection module is configured to detect whether a voltage at VBUS is equal to a predetermined voltage, start a process performed by the first determination module in a case that the voltage at VBUS is equal to the predetermined voltage, and start a process performed by the second determination module in a case that the voltage at VBUS is not equal to the predetermined voltage.

The first determination module is configured to determine that the wireless earphone is in the charging case and that the second predetermined condition is met.

The second determination module is configured to determine that the wireless earphone is outside the charging case and that the first predetermined condition is met.

Based on the above embodiments, as a preferred embodiment, the device further includes a third determination module.

The third determination module is configured to determine that the first predetermined condition is met on reception of an instruction indicating that a lid of the charging case is closed.

Based on the above embodiments, as a preferred embodiment, the third determination module is configured to start a countdown of a predetermined time period on reception of the instruction indicating that the lid of the charging case is closed, and determine that the first predetermined condition is met when the countdown ends.

A manner in which each module in the device described in the above embodiments performs an operation is described in detail in the method embodiments, and is not repeated herein.

Figure 8:
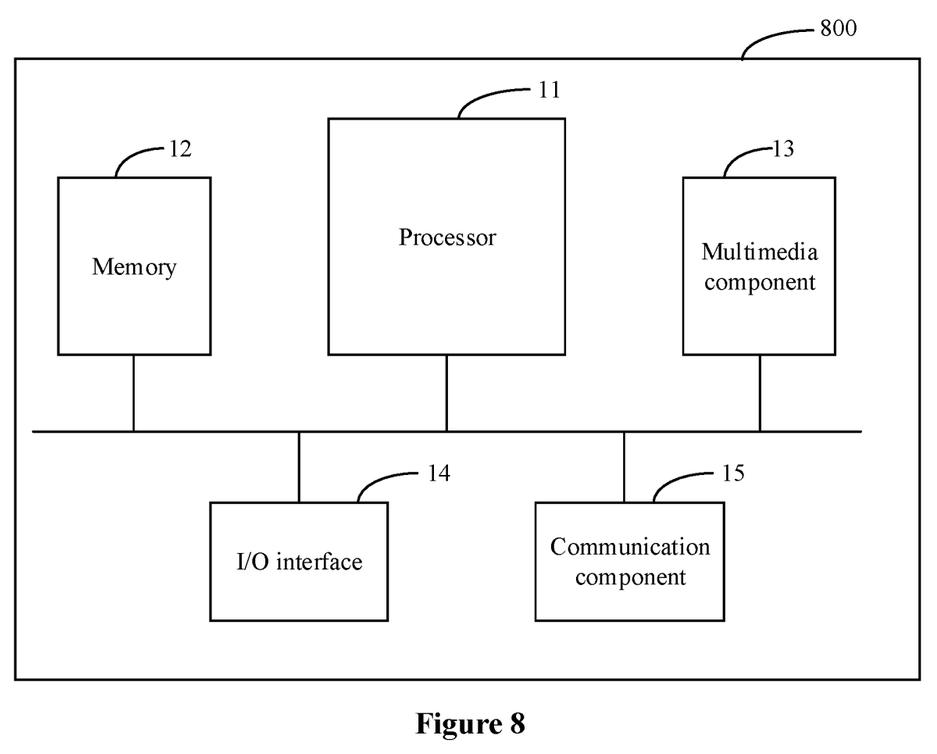
FIG. 8 is a schematic structural diagram of a wireless earphone according to an exemplary embodiment.

A wireless earphone is further provided according to the present disclosure. FIG. 8 is a schematic structural diagram of a wireless earphone 800 according to an embodiment of the present disclosure, as shown in FIG. 8, the wireless earphone 800 includes a processor 11 and a memory 12. The wireless earphone 800 may further include one or more of a multimedia component 13, an input/output (I/O) interface 14, and a communication component 15.

The processor 11 is configured to control an overall operation of the wireless earphone 800 to perform all or part of steps of the method for controlling a serial interface of a wireless earphone. The memory 12 is configured to store various types of data to support the operation of the wireless earphone 800. The data, for example, may include an instruction of any application program or method operated on the wireless earphone 800, and data about the application program such as contact data, a message transmitted and received, a picture, audio, and a video. The memory 12 may be implemented by any type of volatile or non-volatile memory device or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a disk or an optical disc. The multimedia component 13 may include a screen and an audio component. The screen may be, for example, a touch screen. The audio component is configured to output and/or input an audio signal. For example, the audio component may include a microphone configured to receive an external audio signal. The received audio signal may be stored in the memory 12 or transmitted through the communication component 15. The audio component further includes at least one loudspeaker configured to output an audio signal. The I/O interface 14 is configured to provide an interface for the processor 11 and other interface module. The other interface module may be a keyboard, a mouse, a button and the like. The button may be a virtual button or a physical button. The communication component 15 is used for wired or wireless communication between the wireless earphone 800 and other device. The wireless communication may be Wi-Fi communication, Bluetooth communication, Near Field Communication (NFC) communication, 2G communication, 3G communication, 4G communication, or a combination thereof, so that the communication component 15 may include a Wi-Fi module, a Bluetooth module, and a NFC module.

In an exemplary embodiment, the wireless earphone 800 may be implemented by one or more of an Application Specific Integrated Circuit (ASIC), a Digital Signal Processor (DSP), a Digital Signal Processing Devices (DSPD), a Programmable Logic Device (PLD), a Field Programmable Gate Array (FPGA), a controller, a microcontroller, a microprocessor or other electronic component, to perform the above method for controlling a serial interface of a wireless earphone.

In another exemplary embodiment, a computer readable storage medium including a program instruction is further provided. The program instruction is used for performing the steps of the method for controlling a serial interface of a wireless earphone when being executed by a processor. For example, the computer readable storage medium may be the memory 12 including a program instruction. The program instruction may be executed by the processor 11 of the wireless earphone 800 to perform the method for controlling a serial interface of a wireless earphone.

The embodiments in the specification are described in a progressive way, each of which emphasizes the differences from others, and for the same or similar parts among the embodiments, one may refer to description of other embodiments. Since the device disclosed in the embodiments is basically similar to the method therein, the description of the device is relatively simple, and for relevant matters, one may refer to the description of the method embodiments. It should be noted that for those skilled in the art, various improvements and modifications may be made to the present disclosure without departing from the principle of the present disclosure, and the improvements and modifications fall within the protection scope of the claims of the present disclosure.

It should be noted that in the present disclosure, relationship terms such as "first" and "second" are merely for distinguishing one entity or operation from another entity or operation rather than indicating or implying an actual relationship or order between these entities or operations. In addition, in this specification, terms of "include", "comprise" or any other variants are intended to be non-exclusive. Therefore, a process, a method, an article or a device including multiple elements includes not only the elements but also other elements that are not enumerated, or also include elements inherent in the process, the method, the article or the device. Unless expressively limited otherwise, the statement "comprising (including) one . . . " does not exclude a case that other similar elements may exist in the process, the method, the article or the device.

The invention claimed is:

1. A method for controlling a serial interface of a wireless earphone, comprising:
    disabling a serial interface function of the wireless earphone in a case that a first predetermined condition is met, wherein the first predetermined condition comprises that the wireless earphone is outside a charging case, or the wireless earphone is in the charging case and a lid of the charging case is closed; and
    enabling the serial interface function of the wireless earphone in a case that a second predetermined condition is met, wherein the second predetermined condition comprises that the wireless earphone is in the charging case and the lid of the charging case is open,
    wherein after the disabling the serial interface function of the wireless earphone, the method further comprises:
    setting an RX/TX interface of the wireless earphone to be a general IO interface;
    wherein after the setting the RX/TX interface of the wireless earphone to be the general IO interface, the method further comprises:
    activating interrupt enablement of the RX/TX interface; and
    wherein before the enabling the serial interface function of the wireless earphone, the method further comprises:
    receiving an idle code transmitted by the charging case and triggering an interrupt of the RX/TX interface.

2. The method for controlling a serial interface of a wireless earphone according to claim 1, further comprising:
    detecting whether a voltage at VBUS is equal to a predetermined voltage;
    determining that the wireless earphone is in the charging case and that the second predetermined condition is met in a case that the voltage at VBUS is equal to the predetermined voltage; and
    determining that the wireless earphone is outside the charging case and that the first predetermined condition is met in a case that the voltage at VBUS is not equal to the predetermined voltage.

3. The method for controlling a serial interface of a wireless earphone according to claim 2, wherein after it is determined that the second predetermined condition is met, the method further comprises:

determining that the first predetermined condition is met on reception of an instruction indicating that the lid of the charging case is closed.

4. The method for controlling a serial interface of a wireless earphone according to claim 3, wherein the determining that the first predetermined condition is met comprises:
   starting a countdown of a predetermined time period; and
   determining that the first predetermined condition is met when the countdown ends.

5. A wireless earphone, comprising:
   a memory configured to store a computer program; and
   a processor configured to execute the computer program to perform the method for controlling a serial interface of a wireless earphone according to claim 1.

6. A computer readable storage medium, wherein the computer readable storage medium stores a computer program that, when being executed by a processor, performs the method for controlling a serial interface of a wireless earphone according to claim 1.

* * * * *